US012692096B2

(12) United States Patent
Chae et al.

(10) Patent No.: US 12,692,096 B2
(45) Date of Patent: Jul. 28, 2026

(54) ROLL STACKING DEVICE FOR SECONDARY BATTERIES

(71) Applicant: LG ELECTRONICS INC., Seoul (KR)

(72) Inventors: Byungsu Chae, Seoul (KR); Ilsu Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/145,420

(22) PCT Filed: Feb. 14, 2023

(86) PCT No.: PCT/KR2023/002107
§ 371 (c)(1),
(2) Date: Jul. 2, 2025

(87) PCT Pub. No.: WO2024/147406
PCT Pub. Date: Jul. 11, 2024

(65) Prior Publication Data
US 2026/0116674 A1 Apr. 30, 2026

(30) Foreign Application Priority Data
Jan. 6, 2023 (KR) ........................ 10-2023-0002432

(51) Int. Cl.
*B65G 47/32* (2006.01)
*B65G 47/52* (2006.01)
*B65G 47/84* (2006.01)
*H01M 10/04* (2006.01)

(52) U.S. Cl.
CPC ............. *B65G 47/32* (2013.01); *B65G 47/52* (2013.01); *B65G 47/848* (2013.01);
(Continued)

(58) Field of Classification Search
CPC .................... B65G 47/32; B65G 47/52; B65G 2203/0233; B65G 47/848; H01M 10/0404; H01M 10/0413
See application file for complete search history.

(56) References Cited

U.S. PATENT DOCUMENTS 4,921,398 A * 5/1990 Fluck ..................... B65H 29/18
198/689.1
5,465,824 A * 11/1995 Van Maanen ........... B65B 35/50
53/152
(Continued)

FOREIGN PATENT DOCUMENTS

CN 107284993 A * 10/2017 ............. B65G 47/52
CN 107293803 A 10/2017
(Continued)

OTHER PUBLICATIONS

International Search Report (PCT/ISA/210) issued in PCT/KR2023/002107, dated Oct. 4, 2023.

*Primary Examiner* — James R Bidwell
(74) *Attorney, Agent, or Firm* — Birch, Stewart, Kolasch & Birch, LLP

(57) ABSTRACT

A roll stacking device for secondary batteries according to the present embodiment comprises: an input conveyor for transferring cells; a discharge conveyor spaced apart from the input conveyor; and a roll module having rolls for stacking the cells transported by the input conveyor on the upper side of the discharge conveyor in a forward-backward direction, wherein the rolls include a roll body on which at least one cell seating portion is formed and an adsorption pad which is mounted on the roll body and adsorbs the cells.

10 Claims, 5 Drawing Sheets

(52) U.S. Cl.
   CPC ... *H01M 10/0404* (2013.01); *H01M 10/0413*
   (2013.01); *B65G 2203/0233* (2013.01); *B65G*
   *2203/041* (2013.01)

(56)                References Cited

U.S. PATENT DOCUMENTS

|             |     |         |              |
| ----------- | --- | ------- | ------------ |
| 5,595,280   | A   | 1/1997  | Spatafora    |
| 2009/0145556 | A1  | 6/2009  | Schell       |
| 2020/0383840 | A1  | 12/2020 | Arima et al. |
| 2021/0098813 | A1  | 4/2021  | Lee          |
| 2022/0302489 | A1  | 9/2022  | Kim          |

FOREIGN PATENT DOCUMENTS

| CN | 212366027 | U | 1/2021 |
| -- | --------- | - | ------ |
| CN | 212967796 | U | 4/2021 |

| CN | 216288599     | U   |   | 4/2022  |              |
| -- | ------------- | --- | - | ------- | ------------ |
| CN | 216563270     | U   |   | 5/2022  |              |
| CN | 117509094     | A   | * | 2/2024  | ............ B65G 47/22 |
| EP | 4 011 808     | A1  |   | 6/2022  |              |
| KR | 10-1730469    | B1  |   | 4/2017  |              |
| KR | 10-2020-0037975 | A   |   | 4/2020  |              |
| KR | 10-2020-0041603 | A   |   | 4/2020  |              |
| KR | 10-2099290    | B1  |   | 4/2020  |              |
| KR | 10-2020-0066018 | A   |   | 6/2020  |              |
| KR | 10-2021-0037328 | A   |   | 4/2021  |              |
| KR | 10-2021-0106002 | A   |   | 8/2021  |              |
| KR | 10-2021-0111599 | A   |   | 9/2021  |              |
| KR | 20210111597   | A   | * | 9/2021  | ........ H01M 10/0413 |
| KR | 10-2021-0122106 | A   |   | 10/2021 |              |
| KR | 10-2022-0022198 | A   |   | 2/2022  |              |
| KR | 10-2022-0025500 | A   |   | 3/2022  |              |
| KR | 10-2022-0032670 | A   |   | 3/2022  |              |
| KR | 10-2022-0129276 | A   |   | 9/2022  |              |

* cited by examiner

【FIG. 1】
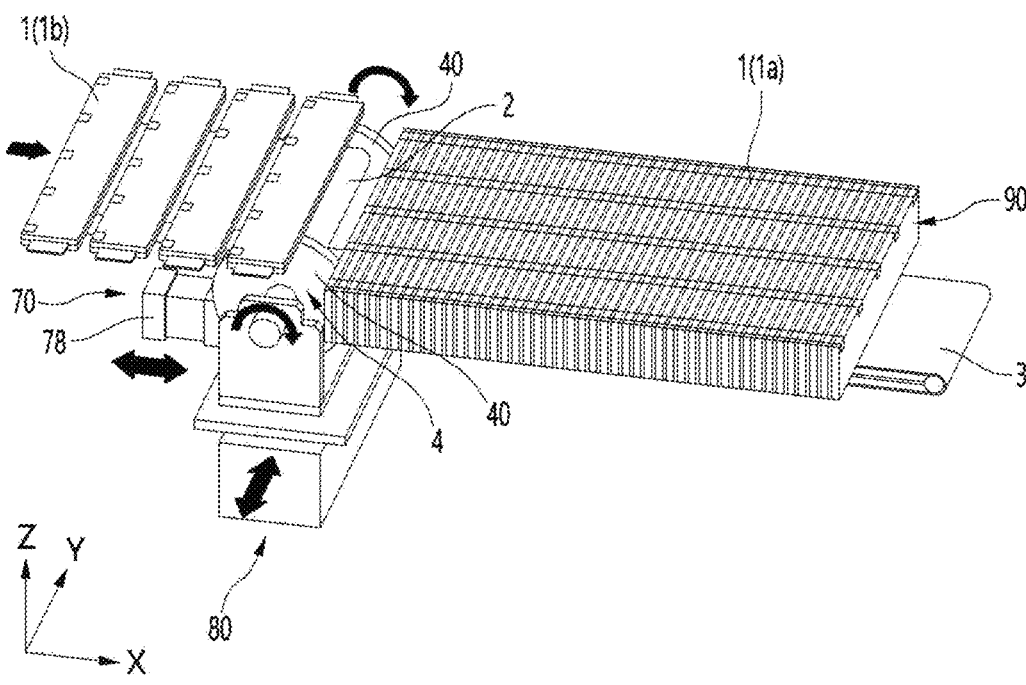

【FIG. 2】
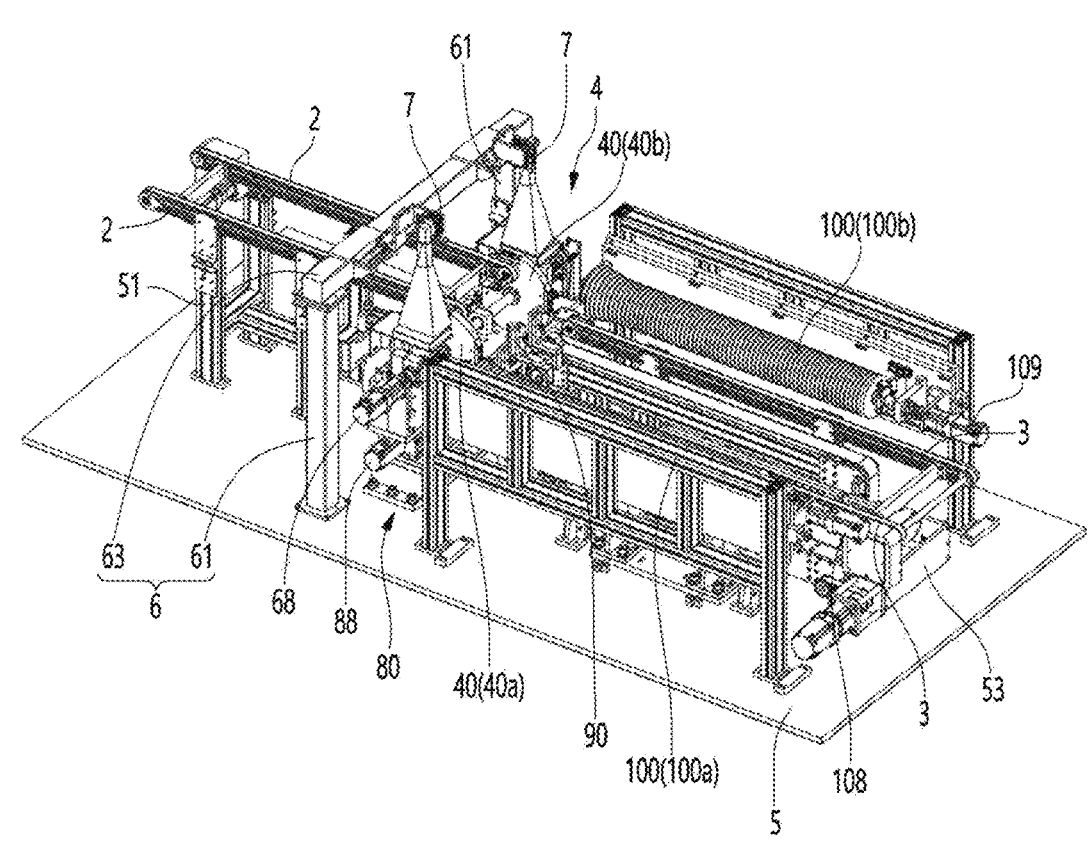

【FIG. 3】
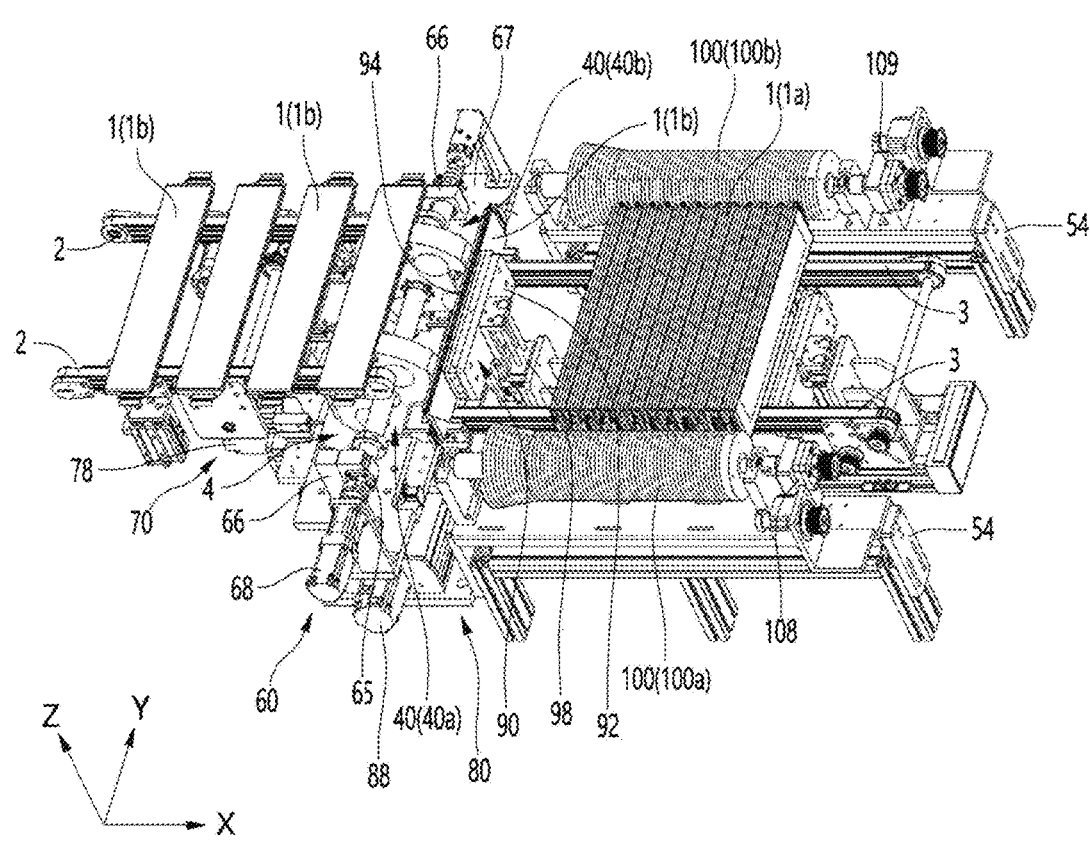

【FIG. 4】
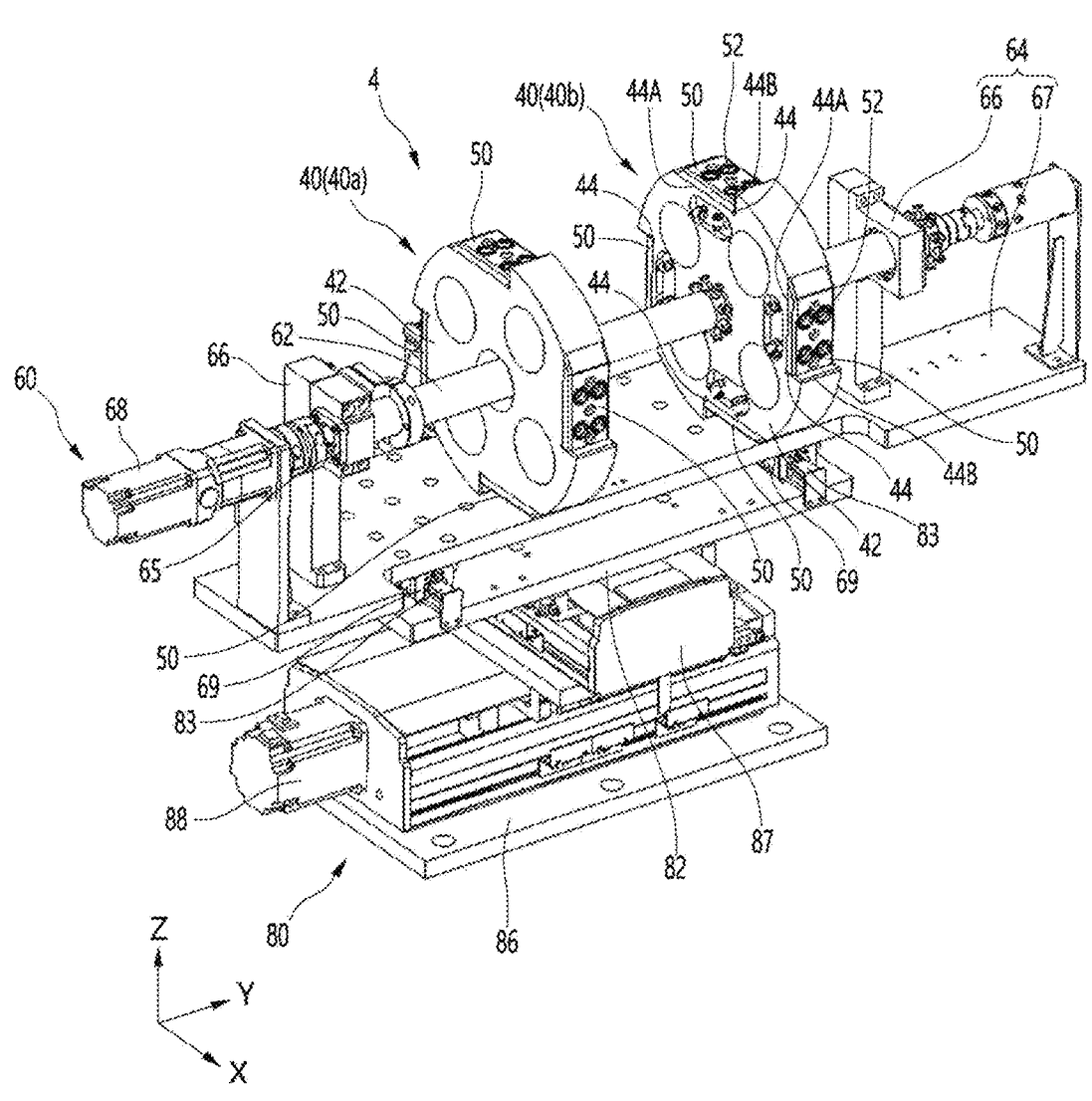

【FIG. 5】
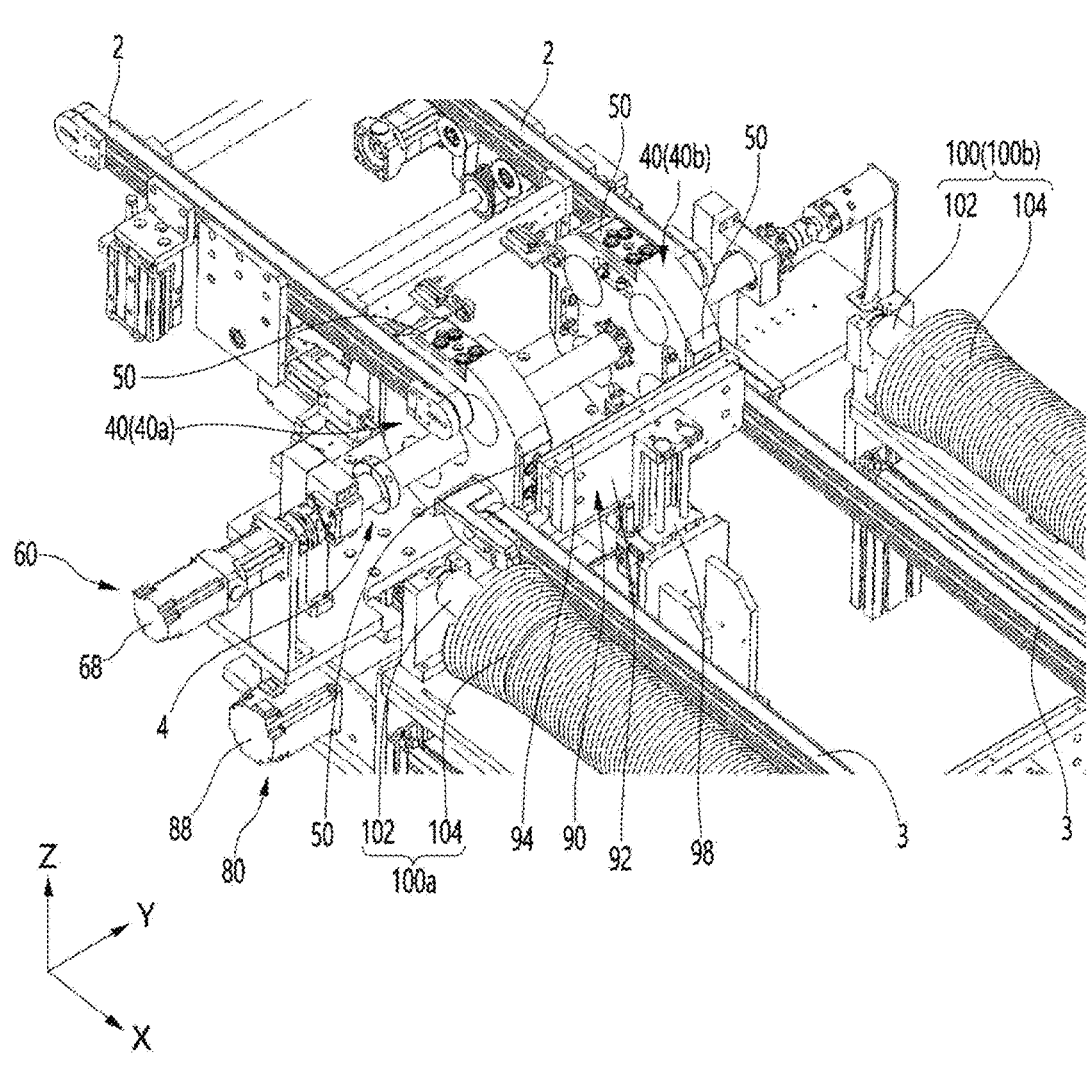

ROLL STACKING DEVICE FOR SECONDARY BATTERIES

CROSS REFERENCE TO RELATED APPLICATIONS

This application is the National Phase of PCT International Application No. PCT/KR2023/002107, filed on Feb. 14, 2023, which claims priority under 35 U.S.C. 119(a) to Patent Application No. 10-2023-0002432, filed in the Republic of Korea on Jan. 6, 2023, all of which are hereby expressly incorporated by reference into the present application.

TECHNICAL FIELD

The present disclosure relates to a roll stacking device for a secondary battery.

BACKGROUND ART

A secondary battery is a device that converts electrical energy into chemical energy, stores the chemical energy, and then generates electricity when needed, in which both charging and discharging occur at a single electrode, and the oxidation electrode (anode, negative electrode) and reduction electrode (cathode, positive electrode) are distinguished based on the discharge reaction.

A secondary battery includes a positive electrode plate and a negative electrode plate having an active material applied to a current collector, a separator separating the positive electrode plate and the negative electrode plate, an electrolyte transmitting ions through the separator, a case accommodating the positive electrode plate, the separator, and the negative electrode plate, and a lead tab connected to the positive electrode plate and the negative electrode plate, and extends outward.

Secondary batteries can be classified into cylindrical, prismatic, and pouched types according to their shape.

Pouch-type secondary batteries are widely used in the secondary battery industry because their shape can be relatively free, including cases such as flexible pouches, their manufacturing process is relatively easy, and their manufacturing cost is low.

Korean Patent Publication No. 10-2021-0106002 A (published on Aug. 27, 2021) discloses a cell stacking device for a secondary battery that stacks a plurality of cells in a horizontal direction, the cell stacking device for a secondary battery including: a plurality of forks that support both end parts of each cell so that the plurality of cells are vertically loaded and are arranged in a row in a first horizontal direction; a fork guide rail that is formed long in the first direction and guides the plurality of forks to move in the first direction; a stacking reference part located on one side of the plurality of forks with respect to the first direction; a stacking pressurizing part located on the other side of the plurality of forks with respect to the first direction; and a stacking mechanism that moves the stacking pressurizing part toward the stacking reference part.

DISCLOSURE

Technical Problem

An object of the present embodiment is to provide a roll stacking device for a secondary battery that can flexibly respond to changes in cell thickness or cell stacking quantity.

An object of the present embodiment is to provide a roll stacking device for a secondary battery capable of improving the stacking speed of cells and stacking cells with high precision.

An object of the present embodiment is not limited to the type of cell, and provides a roll stacking device for a secondary battery capable of stacking a plurality of cells.

Technical Solution

A roll stacking device for a secondary battery according to the present embodiment may include an input conveyor transferring cells; a discharge conveyor spaced apart from the input conveyor; and a roll module having a roll for stacking cells transferred by the input conveyor on an upper side of the discharge conveyor in a front and rear direction.

The roll may include a roll body having at least one cell seating portion formed therein, and an adsorption pad mounted on the roll body and adsorbing cells.

The adsorption pad adsorbs the cell between the cell seated on the cell seating portion and the roll body.

The roll module may include a roll rotation mechanism rotating the roll body, and a roll advancing and retreating mechanism moving the roll rotation mechanism in the front and rear direction to advance and retreat the roll.

The roll module may include a pair of rolls spaced apart in a left and right direction.

The roll rotation mechanism may include a rotation shaft connected to each of the pair of rolls, a rotation shaft supporter supporting the rotation shaft, and a rotation drive source connected to the rotation shaft and rotating the rotation shaft.

The roll advancing and retreating mechanism may advance and retreat the rotation shaft supporter.

The roll stacking device for a secondary battery may further include a vision camera sensor photographing cells adsorbed on the roll.

The roll module may further include a roll correction mechanism for correcting a position of the roll in a left and right direction.

The roll stacking device for a secondary battery may further include a cell stacker supporting cells transferred from the roll.

The cell stacker may include a stack body moving in the front and rear direction, and a sub-absorbing pad arranged on the stack body and absorbing the cell.

The roll stacking device for a secondary battery may further include an insulating screw disposed next to the discharge conveyor and separating leads of a plurality of cells.

A pair of insulating screws may be provided between which the discharge conveyor is provided.

Advantageous Effect

According to the present embodiment, since the cells are rotated and stacked after being seated on the roll, it is easy to change the thickness of the cells or the number of cells stacked, and the flexibility is high.

In addition, since cell stacking and other cell transfer can be performed simultaneously, the speed of cell stacking can be improved.

In addition, the position of the roll can be corrected by the camera sensor and roll compensation mechanism, and cells can be stacked with high precision.

In addition, it is not limited to the kind or type of cell, and a plurality of cells can be stacked, allowing for general use.

In addition, it is possible to prevent the leads of a plurality of cells stacked by the insulating screw from coming into contact, and to minimize a short circuit that may occur when the leads of a plurality of cells come into contact.

DESCRIPTION OF DRAWINGS

FIG. 1 is a schematic view illustrating a roll stacking device for a secondary battery according to the present embodiment.

FIG. 2 is a perspective view illustrating a roll stacking device for a secondary battery according to the present embodiment.

FIG. 3 is a perspective view illustrating a state where the base and post according to the present embodiment are separated.

FIG. 4 is an enlarged perspective view illustrating a roll module according to the present embodiment.

FIG. 5 is an enlarged perspective view the present embodiment a cell stacker and an insulating screw according to the present embodiment.

BEST MODE

Hereinafter, specific embodiments of the present disclosure will be described in detail with reference to the drawings.

FIG. 1 is a schematic view illustrating a roll stacking device for a secondary battery according to the present embodiment, FIG. 2 is a perspective view illustrating a roll stacking device for a secondary battery according to the present embodiment, FIG. 3 is a perspective view illustrating a state where the base and post according to the present embodiment are separated, FIG. 4 is an enlarged perspective view illustrating a roll module according to the present embodiment, and FIG. 5 is an enlarged perspective view the present embodiment a cell stacker and an insulating screw according to the present embodiment.

A roll stacking device for a secondary battery stacks cells 1 in a front and rear direction X and may include an input conveyor 2, an output conveyor 3, and a roll module 4.

A roll stacking device for a secondary battery may be a cell stacking device for a secondary battery that stacks cells 1 in a roll manner using a roll module 4.

A cell 1 stacked by a roll stacking device for a secondary battery may be a stacked cell 1a. A plurality of cells 1 may become a stacked cell 1a, and the stacked cell 1a may be configured as a cell module of a secondary battery or a cell assembly of a secondary battery.

The cell 1 transferred to be stacked to the stacked cell 1a may be a transfer cell 1b.

The stacked cell 1a and the transfer cell 1b are terms that are distinguished according to whether stacking/transfer is performed, and are hereinafter referred to as cell 1 for convenience of explanation.

Examples of cells 1 may be pouch-shaped cells, square cells, cylindrical cells, or the like, and a roll stacking device for a secondary battery can stack pouch-shaped cells, square cells, cylindrical cells, or the like in the front and rear direction X.

Hereinafter, the description is limited to the case where the cell 1 is a pouch-type cell, but it is obvious that the cell 1 stacked by the roll stacking device for a secondary battery is not limited to a pouch-type cell.

A cell 1 may include a positive electrode plate and a negative electrode plate on which an active material is applied to a current collector, a separator separating the positive electrode plate and the negative electrode plate, an electrolyte that transmits ions through the separator, a pouch that accommodates the positive electrode plate, the separator, and the negative electrode plate, and a lead that is connected to the positive electrode plate and the negative electrode plate and extends out of the pouch.

The cell 1 can be placed on an input conveyor 2 together with a pad (not illustrated). The pad can be a stacked cell 1a together with the cell 1, and can dissipate heat from the cell 1 between adjacent cells forming the stacked cell 1a, and can have a function of preventing fire from spreading to the surroundings in the event of a fire in the stacked cell 1a. The pad can be attached to one surface of the cell 1 before the cell 1 is transferred.

The cell 1 can have an adhesive formed on it before being placed on the input conveyor 2. The cell 1 can be placed on the input conveyor 2 with the adhesive formed on the other surface.

The other surface of the cell 1 may be the opposite surface of one surface of the cell 1, and the adhesive may be attached to an adjacent other cell 1 or pad of the stacked cell 1a.

In other words, the cell 1 placed on the input conveyor 2 may be a cell having a pad attached to a bottom surface thereof and an adhesive formed on an upper surface thereof.

The cell 1 can be placed on the input conveyor 2 so that the longitudinal direction (that is, the long direction) of the cell 1 becomes the left and right direction Y.

The input conveyor 2 can transfer the cells 1. The input conveyor 2 can transfer the cells 1 in the front and rear direction X. The input conveyor 2 can sequentially transport a plurality of cells 1 to the roll module 4.

A pair of input conveyors 2 may be provided, and an input conveyor drive part for operating the pair of input conveyors 2 may be connected to the pair of input conveyors 2.

A pair of input conveyors 2 can be spaced apart in the left and right direction Y, and the spacing between the pair of input conveyors 2 can be shorter than the length of the cell 1 (that is, the long length).

The discharge conveyor 3 can be spaced apart from the input conveyor 2. The height of the discharge conveyor 3 may be lower than the height of the input conveyor.

A pair of discharge conveyors 3 may be provided, and a discharge conveyor drive part for operating a pair of discharge conveyors 3 may be connected to a pair of discharge conveyors 3.

A pair of discharge conveyors 3 may be spaced apart in the left and right direction Y, and the spacing between the pair of discharge conveyors 3 can be shorter than the length of the cell 1 (that is, the long length).

Cells 1 transferred by the roll module 4 may be stacked on the discharge conveyor 3.

The roll module 4 may include a roll 40.

The roll 40 can move the cell 1 transferred by the input conveyor 2 to the upper side of the discharge conveyor 3, and the cell 1 can be sequentially stacked on the upper side of the discharge conveyor 3 in the front and rear direction X.

The roll 40 can vertically erect the cell 1 that has been horizontally transferred from the input conveyor 2 and transfer the cell 1 to the discharge conveyor 3.

The roll 40 may include a roll body 42 and an adsorption pad 50, as illustrated in FIG. 4.

At least one cell seating portion 44 may be formed on the roll body 42. The roll body 42 may have an approximately circular shape. The cell seating portion 44 may be formed on the outer circumferenceof the roll body 42. The cell seating portion 44 may be formed in a recessed shape in the roll body 42. A plurality of cell seating portions 44 may be formed on the roll body 42. The plurality of cell seating portions 44 may be formed to be spaced apart from each other in the circumference direction on the outer circumference of the roll body 42. For example, four cell seating portions 44 may be formed on the roll body 42, and the roll body 42 may stack four cells 1 during one rotation. The number of cell seating portions 44 may be two or three, or may be five or more, and it is obvious that the present embodiment is not limited to the number of cell seating portions 44.

The adsorption pad 50 can be mounted on the roll body 42. The adsorption pad 50 may be coupled to the roll body 42 and can rotate around the center of rotation of the roll body 42 when the roll body 42 rotates.

The adsorption pad 50 can support the cell 1 and may absorb the cell 1. A suction tube (not illustrated) may be connected to the adsorption pad 50, and the suction tube can be connected to a suction mechanism (not illustrated) such as a compressor.

The adsorption pad 50 may be formed with adsorption holes 52 that communicate with the suction tube. A plurality of adsorption holes 52 may be formed, and the plurality of adsorption holes 52 may adsorb the cell 1 seated on the cell seating portion 44 and the adsorption pad 50.

The adsorption pad 50 may correspond 1:1 with the cell seating portion 44. The adsorption pad 50 may be accommodated in the cell seating portion 44. The size of the adsorption pad 50 can be smaller than the size of the cell seating portion 44. The cell seating portion 44 may include an adsorption pad accommodation area 44A that accommodates the adsorption pad 50 and a cell accommodation area 44B that accommodates the cell 1*b*.

The adsorption pad 50 can be brought into contact with the adsorption pad accommodation area 44A, and the cell 1 transferred by the input conveyor 2 can be brought into contact with the adsorption pad 50 and the cell accommodation area 44B.

In other words, the adsorption pad 50 may adsorb the cell 1 transferred to the cell seating portion 44 while it is accommodated in the cell seating portion 44. When the cell 1 is transferred to the roll 40 by the input conveyor 2, the adsorption pad 50 may adsorb the cell 1 between the cell 1 seated on the cell seating portion 44 and the roll body 42.

The roll module 4 may include a pair of rolls 40 spaced apart in the left and right direction Y. The pair of rolls 40 may include a left roll 40*b* and a right roll 40*b*. The left roll 40*b* and the right roll 40*b* may be spaced apart in the left and right direction Y. The left roll 40*b* and the right roll 40*b* may be symmetrical left-right. The left roll 40*b* and the right roll 40*b* may rotate together in the same direction, and the left side of the cell 1 may be mounted on the left roll 40*a*, and the right side of the cell 1 may be mounted on the right roll 40*b*.

The roll module 4 may include a roll rotation mechanism 60.

The roll rotation mechanism 60 is connected to the roll body 42 and may rotate the roll 40.

The roll rotation mechanism 60 may include a rotation shaft 62 connected to each of a pair of rolls 40, a rotation shaft supporter 64 supporting the rotation shaft 62, and a rotation driving source 68 connected to the rotation shaft 62 and rotating the rotation shaft 62.

The rotation shaft 62 may be arranged long in the left and right direction Y.

The rotation shaft supporter 64 may include a shaft support member 65 through which the rotation shaft 62 passes, a post 66 on which the shaft support member 65 is installed, and a support plate 67 that supports the post 66 from the lower side of the post 66.

An example of a shaft support member 65 may be a bearing.

Each of the shaft support member 65 and the post 66 can be positioned left and right, and can support the left and right sides of the rotation shaft 60 in a distributed manner.

The rotational drive source 68 may include a motor connected to one side of the rotational shaft 62, and the rotational drive source 68 may include a roll rotation motor that rotates the roll 40. The roll rotation motor may be directly connected to the rotational shaft 62 or may be connected to the rotational shaft 62 through at least one power transmission member such as a gear.

The roll module 4 may further include a roll advancing and retreating mechanism 70, as illustrated in FIGS. 1 and 3.

The roll advancing and retreating mechanism 70 may advance and retreat the roll 40 by moving the roll rotation mechanism 60 in the front and rear direction X. The roll advancing and retreating mechanism 70 is connected to the rotation shaft supporter 64 and may advance and retreat the rotation shaft supporter 64 in the front and rear direction X.

The roll advancing and retreating mechanism 70 may include a connector (not illustrated) connected to a rotation shaft supporter 64 and an advancing and retreating driving source 78 that moves the connector (not illustrated) linearly in the front and rear direction X.

The connector may be a power transmission member that transmits the driving force of the advancing and retreating driving source 78 to the rotation shaft supporter 64.

The advancing and retreating driving source 78 may include a motor connected to one side of the connector, and the advancing and retreating driving source 78 may include a roll movement motor that moves the roll 40. The roll movement motor may be directly connected to the connector, or may be connected to the connector through at least one power transmission member such as a gear.

The roll module 4 may further include a roll correction mechanism 80 that corrects the position of the roll 40 in the left and right direction.

The roll compensation mechanism 80 may be placed on the lower side of the roll rotation mechanism 60, particularly the rotation shaft supporter 64, as illustrated in FIG. 4.

The roll compensation mechanism 80 may include a carrier 82 connected to the roll rotation mechanism 60.

The carrier 82 can be placed on the rotation shaft supporter 64, particularly, on the lower side of the support plate 67. The support plate 67 can be placed on the upper side of the carrier 82 so as to be movable in the front and rear direction X. A slide guide 69 that slides in the front and rear direction X along a guide rail 83 provided on the carrier 82 can be mounted on the lower side of the support plate 67.

The guide rail 83 can be arranged long on the carrier 82 in the front and rear direction X.

The slide guide 69 can be restrained to the guide rail 83 in the left and right direction Y and guided along the guide rail 83 in the length direction (X, that is, front and rear direction) of the guide rail 83.

The roll compensation mechanism 80 may further include a compensation base 86 and a compensation driving source 88.

The correction driving source 88 can be placed on the correction base 86 and connected to the carrier 82. The correction driving source 88 can be placed between the correction base 86 and the carrier 82 and can move the carrier 82 linearly in the left and right direction Y.

The compensation drive source 88 may further include a connector 87 connected to the carrier 82 and may include a motor connected to the connector 87.

The correction drive source 88 may include a roll correction motor that corrects the position (that is, position in the left and right direction) of the roll 40 by linearly moving the carrier 82 and the rotation shaft supporter 64 in the left and right direction Y. The roll correction motor may be directly connected to the connector 87 or may be connected through at least one power transmission member such as a gear.

Meanwhile, the correction drive source 88 is of course not limited to any type as long as it has a configuration that can move the carrier 82 in the left and right direction Y.

The roll stacking device for a secondary battery may further include a base 5, a main post 6, and a vision camera 7, as illustrated in FIG. 2.

The base 5 may form the bottom surface of a roll stacking device for a secondary battery.

The input conveyor 2 can be arranged on the upper side of the base 5. A pair of input conveyors 2 can be provided on the upper side of the base 5.

An input post 51 supporting an input conveyor 2 can be arranged on the base 5, and the input conveyor 2 can be supported on the upper part of the input post 51.

The discharge conveyor 3 can be arranged on the upper side of the base 5. A pair of discharge conveyors 3 can be provided on the upper side of the base 5.

A discharge supporter 53 that supports a discharge conveyor 3 can be placed on the base 5, and the discharge conveyor 3 can be supported on the upper part of a discharge post 53.

Meanwhile, a roll compensation mechanism 80 may be placed on the base 5. The roll compensation mechanism 80 may move the roll rotation mechanism 60 in the left and right direction Y while placed on the upper surface of the base 5.

The main post 6 may include a pair of vertical posts 61 erected on the upper side of the base 5 and a horizontal support 63 arranged long in the left and right direction Y on the upper side of the pair of vertical posts 61.

The vision camera 7 can photograph the cell 1 absorbed on the roll 40. The vision camera 7 can be mounted on the main post 6 and can photograph the cell 1 from the upper side of the cell 1.

The vision camera 7 may be mounted on a horizontal support 63.

The vision camera 7 may measure the correction amount for the position of the cell 1 absorbed on the roll 40, especially the absorption pad 50.

The roll stacking device for a secondary battery can correct the position of the roll 40 in the left and right direction Y by the photographing data of the vision camera 7 or the correction amount.

The vision camera 7 can correspond 1:1 with the roll 40. A pair of vision cameras 7 can be provided, and the left vision camera located on the left side of the pair of vision cameras 7 can capture the left roll 40*a*, and the right vision camera located on the right side of the pair of vision cameras 7 can capture the right roll 40*b*.

The roll correction mechanism 80 can be driven by the correction driving source 88 according to the measurement result of the vision camera 7, and the position of the roll 40 in the left and right direction Y can be adjusted by the vision camera 7 and the roll correction mechanism 80.

The cell stacker 90 can support the cell 1 moved from the roll 40, and the cell 1 moved from the roll 40 can be stacked on the cell stacker 90 in a horizontal direction, particularly in the front and rear direction X.

The cell stacker 90 may be a stacking stage in which a plurality of cells 1 are sequentially stacked. The cell stacker 90 may be positioned so as to be movable in the front and rear direction X between a pair of discharge conveyors 3, and as the cell stacker 90 moves in the front and rear direction X, a plurality of cells 1 may be sequentially stacked in the front and rear direction X on the cell stacker 90.

The cell stacker 90 may further include a stack body 92 and a sub-absorbent pad 94.

The stack body 92 may be erected in the vertical direction Z and can support the cell 1.

The stack body 92 can move in a direction parallel to the length direction of the discharge conveyor 3 (that is, front and rear direction). As the cells 1 are sequentially stacked, the stack body 92 can move, and a plurality of cells 1 can be sequentially stacked by the movement of the stack body 92.

The sub-absorbent pad 94 can absorb the cell 1 located on the roll 40. The sub-absorbent pad 94 can be placed on the surface of the stack body 92 facing the roll 40.

The sub-absorption pad 94 can absorb a cell 1 that is placed on the cell seating portion 44 while being placed on the stack body 92, and when the sub-absorption pad 94 absorbs the cell 1, the cell 1 can be transferred from the roll 40 to the cell stacker 90.

A suction tube (not illustrated) can be connected to the sub-adsorption pad 94. The suction tube can be connected to a suction mechanism (not illustrated) such as a compressor.

The sub-absorbent pad 94 can be formed with an adsorption hole (not illustrated) that communicates with a suction tube. A plurality of adsorption holes can be formed, and the plurality of adsorption holes can adsorb a cell 1 seated on the cell seating portion 44. The cell 1 can be transferred from the cell seating portion 44 to the sub-absorption pad 94.

The cell stacker 90 may further include a stack driving source 98 that moves the stack body 92 in the front and rear direction X.

The stack driving source 98 may include a connector connected to the stack body 92. The stack driving source 98 may further include a motor connected to the connector. The stack driving source 98 may include a stack motor that moves the stack body 92.

The stack drive source 98 can move the stack body 92 at a constant speed with the discharge conveyor 3.

The stack driving source 98 may also include a stack conveyor that moves the stack body 92 parallel to the discharge conveyor 3, and a stack conveyor driving source such as a motor that operates the stack conveyor.

The stack conveyor may be circulated along the same trajectory as the discharge conveyor 3, and the stack conveyor can be operated parallel to the discharge conveyor 3 by the stack conveyor driving source.

A plurality of stack bodies 92 can be provided on the stack conveyor, and the cell stacker 90 can continuously stack stacked cells 1*a*.

The cell stacker 90 can operate in conjunction with the discharge conveyor 3, and can also form a part of the discharge conveyor 3.

Meanwhile, the roll stacking device for a secondary battery may further include an insulating screw 100.

An insulating screw 100 is placed next to the discharge conveyor 3 and may separate the leads of a plurality of cells 1.

Each of the plurality of cells 1 stacked on the cell stacker 90 may include a lead, and the insulating screw 100 may include a rotating shaft part and a spacer part that separates the leads of the plurality of cells 1.

The spacer part may be a screw part formed in a spiral shape on the outer perimeter of the rotating shaft part.

A pair of insulating screws are provided between which the discharge conveyor is provided. The pair of insulating screws 100 may include a left screw 100a and a right screw 100b.

The left screw 100a may be positioned on the left side of the left discharge conveyor among the pair of discharge conveyors 3, and the right screw 100b may be positioned on the right side of the right discharge conveyor among the pair of discharge conveyors 3. The spacing between the pair of insulating screws 100 may be greater than the spacing between the pair of discharge conveyors 3.

The left lead located on the left side of the cell 1 can be inserted into the screw part of the left screw 100a. The right lead located on the right side of the cell 1 can be inserted into the screw part of the right screw 100b, and each lead of the cell 1 can be maintained spaced apart from the leads of the adjacent other cells 1 in the front and rear direction X.

The roll stacking device for a secondary battery may further include a screw driving source 108, 109 for rotating a pair of insulating screws 100.

The screw driving source 108, 109 may include a motor that rotates the insulating screw 100. The screw driving source 108, 109 may include an insulating screw motor that moves the insulating screw 100.

The screw driving source 108, 109 can correspond 1:1 with the insulating screw 100a, 100b.

The screw driving source 108, 109 may include a left insulating screw driving source 108 connected to the left insulating screw 100a and a right insulating screw driving source 109 connected to the right insulating screw 100b.

A screw post 54 (see FIG. 3) supporting a screw driving source 108, 109 can be arranged on the base 5, and the screw driving source 108, 109 can be supported on the upper part of the screw post 54.

The process of stacking cells 1 by a roll stacking device for a secondary battery configured as described above is explained as follows.

As illustrated in FIG. 3, the transfer cell 1b can be placed on the input conveyor 2 and then transferred to the roll 40 by the input conveyor 2. The transfer cell 1b can be transferred to the cell seating portion 44 of the roll 40 while being placed horizontally, and can be absorbed by the adsorption pad 50 placed on the cell seating portion 44.

While the input conveyor 2 transports the transfer cell 1b, the roll 40 can rotate, and as the roll 40 rotates, the transfer cell 1b can be vertically erected together with the adsorption pad 50 and can face the cell stacker 90 in the front and rear direction X.

The roll advancing and retreating mechanism 70 can advance the roll 40 in the direction of the cell stacker 90, and the transfer cell 1b adsorbed on the adsorption pad 50 can approach the cell stacker 90 and be adsorbed on the auxiliary adsorption pad 94 of the cell stacker 90.

When the auxiliary adsorption pad 94 of the cell stacker 90 absorbs the cell 1, the absorption of the adsorption pad 50 can be released, the transfer cell 1b can be transferred from the adsorption pad 50 of the roll 40 to the auxiliary adsorption pad 1 of the cell stacker 90, and the transfer of the transfer cell 1b can be completed, and this transfer cell 1b can become a stacked cell 1a.

The roll advancing and retreating mechanism 70 may be retracted when the transfer of the transfer cell 1b is completed, and the other transfer cell 1b placed on the input conveyor 2 can be attached to the stacked cell 1a by the roll rotation mechanism 60 and the roll advancing and retreating mechanism 70, and can be attached to and stacked on an existing stacked cell 1a.

As the transfer of the transfer cell 1b continues, the length of the stacked cell 1a in the front and rear direction X may gradually increase, and when the preset number of cells 1 are all completed in stacking, the stacking process of the a plurality of cells 1 can be completed, and the stacked cells 1a stacked on the cell stacker 90 can be moved by a robot or the like for the next process.

The above description is merely an example of the technical idea of the present disclosure, and those skilled in the art will appreciate that various modifications and variations may be made without departing from the essential characteristics of the present disclosure.

Accordingly, the embodiments disclosed in the present disclosure are not intended to limit the technical idea of the present disclosure but to explain it, and the scope of the technical idea of the present disclosure is not limited by these embodiments.

The scope of protection of the present disclosure should be interpreted by the claims below, and all technical ideas within a scope equivalent thereto should be interpreted as being included in the scope of the rights of the present disclosure.

The invention claimed is:

1. A roll stacking device for a secondary battery comprising:

an input conveyor transferring cells;

a discharge conveyor spaced apart from the input conveyor; and a roll module having a roll for stacking cells transferred by the input conveyor on an upper side of the discharge conveyor in a front and rear direction, wherein the roll includes:

a roll body having at least one cell seating portion formed therein, and an adsorption pad mounted on the roll body and adsorbing cells.

2. The roll stacking device for a secondary battery of claim 1, wherein the adsorption pad adsorbs the cell between the cell transferred to the cell seating portion and the roll body.

3. The roll stacking device for a secondary battery of claim 1, wherein the roll module includes:

a roll rotation mechanism rotating the roll body, and a roll advancing and retreating mechanism moving the roll rotation mechanism in the front and rear direction to advance and retreat the roll.

4. The roll stacking device for a secondary battery of claim 3, wherein the roll module includes a pair of rolls spaced apart in a left and right direction, and wherein the roll rotation mechanism includes:

a rotation shaft connected to each of the pair of rolls, a rotation shaft supporter supporting the rotation shaft, and a rotation drive source connected to the rotation shaft and rotating the rotation shaft.

5. The roll stacking device for a secondary battery of claim 4, wherein the roll advancing and retreating mechanism advances and retreats the rotation shaft supporter.

6. The roll stacking device for a secondary battery of claim 3, further comprising:

a vision camera sensor photographing cells adsorbed on the roll, wherein the roll module further includes a roll correction mechanism for correcting a position of the roll in a left and right direction.

7. The roll stacking device for a secondary battery of claim 1, further comprising:

a cell stacker in which cells transferred from the roll are stacked in the front and rear direction.

8. The roll stacking device for a secondary battery of claim 7, wherein the cell stacker includes:

a stack body moving in the front and rear direction, and a sub-absorbing pad arranged on the stack body and absorbing the cell.

9. The roll stacking device for a secondary battery of claim 1, further comprising:

an insulating screw disposed next to the discharge conveyor and separating leads of a plurality of cells.

10. The roll stacking device for a secondary battery of claim 9, wherein a pair of insulating screws are provided between which the discharge conveyor is provided.

* * * * *